United States Patent [19]
Wick et al.

[11] 4,031,550
[45] June 21, 1977

[54] FILM SCANNER

[75] Inventors: Richard Wick, Munich; Friedrich Bestenreiner, Grunwald; Reinhold Deml; Josef Helmberger, both of Munich, all of Germany

[73] Assignee: AGFA-Gevaert, A.G., Leverkusen, Germany

[22] Filed: Feb. 25, 1976

[21] Appl. No.: 661,333

Related U.S. Application Data

[63] Continuation of Ser. No. 384,396, Aug. 1, 1973, which is a continuation of Ser. No. 162,373, July 14, 1971, abandoned.

[30] Foreign Application Priority Data

July 18, 1970 Germany .......................... 2035820

[52] U.S. Cl. ............................................... 358/216
[51] Int. Cl.² ........................................ H04N 3/36
[58] Field of Search ...................... 178/7.2, DIG. 18

[56] References Cited

UNITED STATES PATENTS

| 2,912,487 | 11/1959 | Horsley | 178/DIG. 28 |
| 2,922,841 | 1/1960 | Graziano | 178/DIG. 28 |
| 3,604,850 | 9/1971 | Eckenbrecht et al. | 178/DIG. 28 |
| 3,707,599 | 12/1972 | Brown | 178/DIG. 28 |
| 3,778,545 | 12/1973 | Metzger et al. | 178/DIG. 28 |

Primary Examiner—Robert L. Richardson
Attorney, Agent, or Firm—Michael J. Striker

[57] ABSTRACT

For reproduction on a television receiver, movie film is moved continuously past a scanning region. Each image is scanned three times in direction opposite to film motion, the starting point of each scan being displaced one-third of image height in direction of motion of film.

4 Claims, 9 Drawing Figures

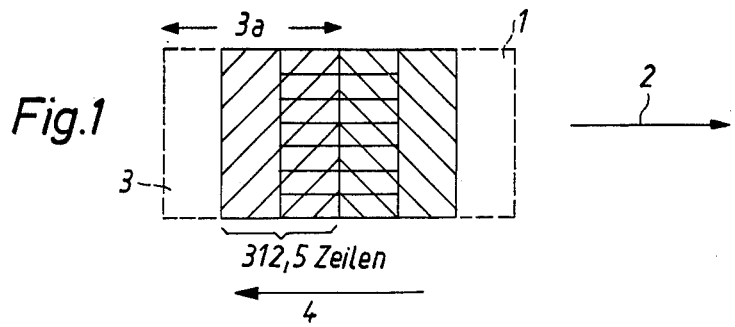
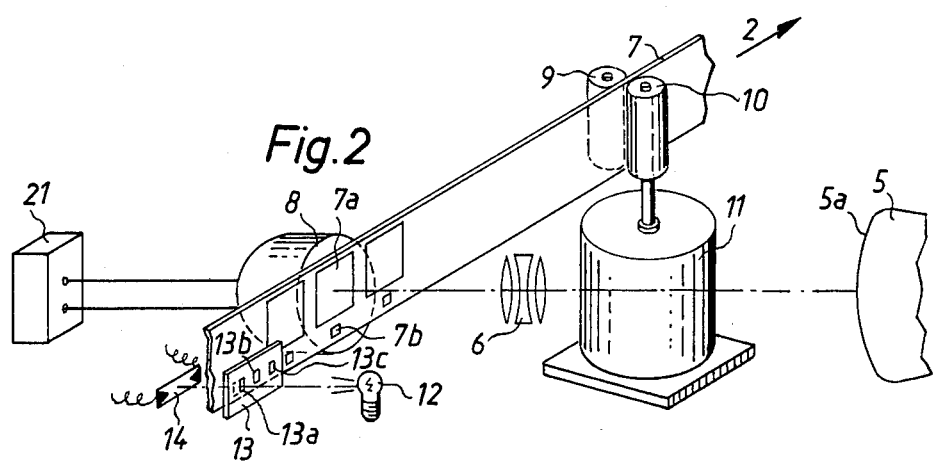
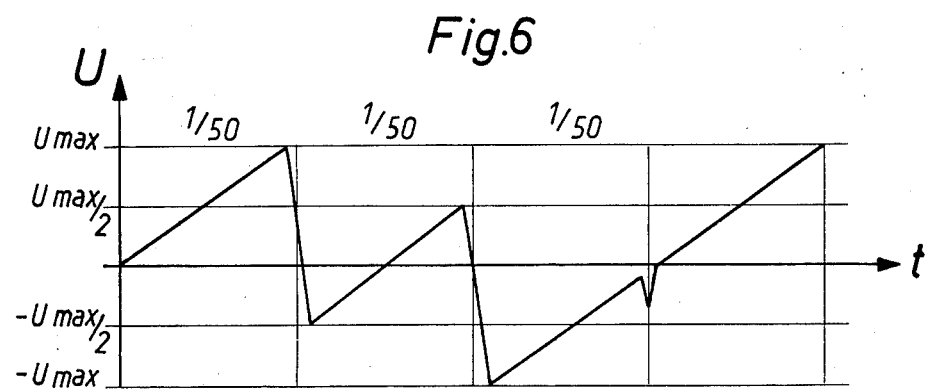

FILM SCANNER

This is a continuation of application Ser. No. 384,396 filed Aug. 1, 1973 which was a continuation of Ser. No. 162,373 filed July 14, 1971, now abandoned.

BACKGROUND OF THE INVENTION

This invention relates to a method and arrangement for point-by-point scanning of a sequence of pictures. More specifically, it relates to the scanning of movie film having a frame frequency of approximately 18 frames per second to be reproduced on a television receiver having a field frequency of approximately 60 fields per second.

In known arrangements for reproducing movie film on television, the film is advanced in a step-by-step manner. The time period wherein the film is in motion must be short relative to the time wherein the scanning takes place. In particular, in television the length of time between two successive vertical scannings is only approximately one-tenth of the total time. Thus the film advance must take place very rapidly, requiring elaborate advancing means and also leading to relatively great wear of the film perforations.

SUMMARY OF THE INVENTION

The invention is a method and system for scanning a sequence of images. It comprises continuously moving said sequence of images in a first direction along a predetermined path. It further comprises scanning each of said images over a determined scanning region at least a first and second time, thereby furnishing scanning signals constituting a first and second scan respectively. It further comprises moving said scanning region a predetermined distance along said predetermined path in said first direction following completion of said first scan. In a preferred embodiment of the present invention, the sequence of images are the images on moving picture film which are adapted for reproduction at 18 images (frames) per second. The images are each scanned a first, second and third time, furnishing first, second and third scans, respectively. The scanning region is moved in the direction of motion of the film by one-third of an image height following completion of the first and of the second scan.

In a preferred arrangement of the present invention, the scanning means comprise a cathode ray tube having a point source of a light beam and a screen. Further comprised are lens means which focus an image of said screen onto each of said images of said film. (It should be noted here that the sequence of images on the elongated signal carrier means in the preferred embodiment of the invention comprises the sesequential frames on a movie film). The height of the screen of the tube exceeds by one-third the height of the image of the screen formed on the movie film. The scanning region for each scan covers a distance of two-thirds of the height of each image during each scan in a direction opposite to the motion of the film.

By means of the method and arrangement of the present invention, a continuous transport of the movie film may be utilized. This transport greatly reducees the wear on the perforations, while requiring relatively little electronic equipment for implementation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic representation of the scanning region;

FIG. 2 is a schematic representation of the scanning arrangement;

FIG. 6 shows the variation of deflection voltage used for deflecting the light beam of the scanning tube.

DESCRIPTION OF THE PREFERRED EMBODIMENTS

Figure 3:
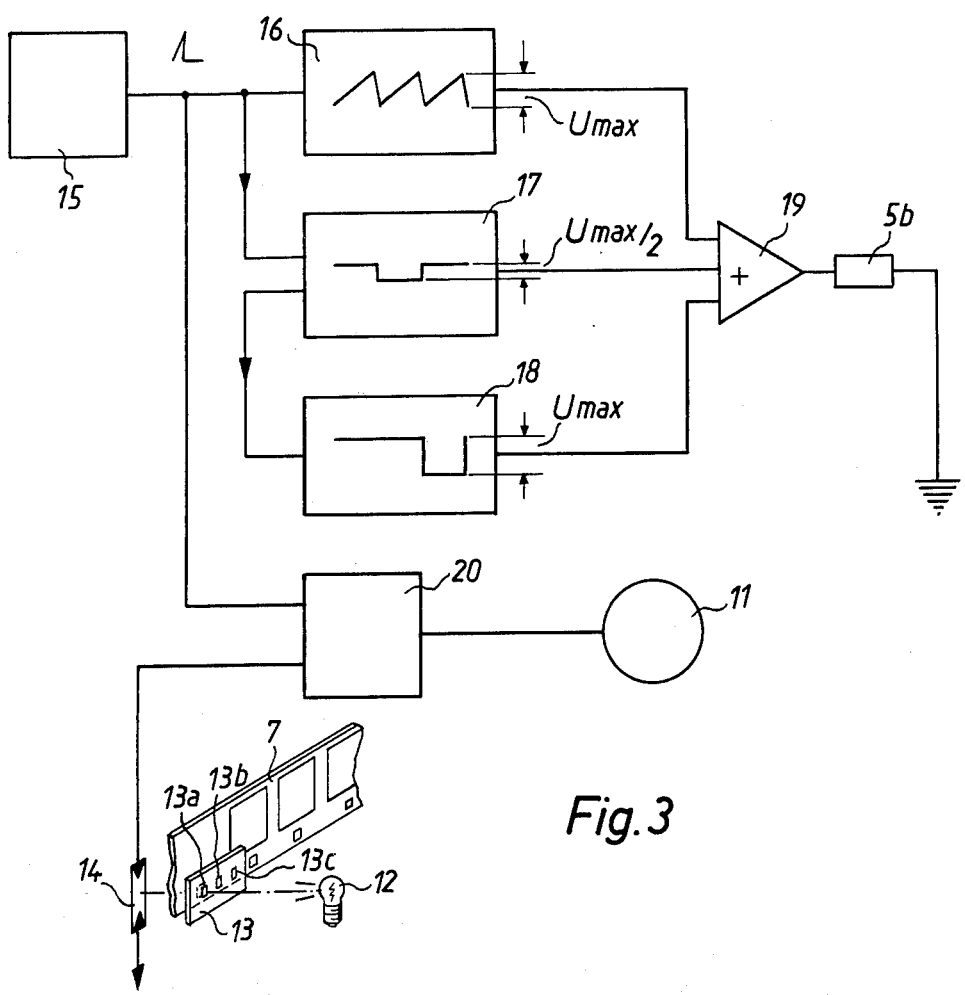
FIG. 3 is a block diagram showing the scan control means.

A preferred embodiment of the present invention will now be described with reference to the drawing.

FIG. 1 shows a graphic representation of the scanning region and the movement of the scanning region during the repetitive scans of each image. In FIG. 1, elongated signal carrier means, labeled 1, may for example comprise moving picture film recorded at 18 frames/sec. This film is transported in the direction of the arrow 2 with a velocity corresponding to one image height in 3/60 second. The scanning region corresponds to a rectangle 3 having a height 3a and a width 3b in a direction perpendicular to the direction of 3a.

The scanning process starts at the lower edge of image 3 and proceeds in the direction of arrow 4 which is opposite to the transport direction of the film. The scanning is a line-by-line scan, sequential lines being scanned in direct sequence. (For the direction of film motion shown in FIG. 1, the horizontal or line scan of the television receiver is in an upward direction, while the vertical scan is in the direction of arrow 4). Because of the motion of the film in the direction of arrow 2, that is opposite to the vertical scanning direction, the trailing edge of image 3 will have reached the position indicated by the solid line (leftmost solid line) at the end of the first scan, that is at the end of a scan corresponding to a television field. At the end of the first scan, the top of the image (trailing edge) is thus removed by only two-thirds of the image height from the starting position of the scan. Therefore, by means of scan control means to be described below, the second scan takes place over a region commencing at a distance translated by one-third of the image height in the direction of motion of the film. The first line of the second scan is thus the solid line which is the solid line second from the right in FIG. 1. The second scan then follows over the complete image height which, however, because of the motion of the film, is reached after scanning a distance of two-thirds of the image height in the direction of arrow 4. The third scanning cycle of the same image then takes place over a scanning region again translated one-third of the image height in the direction of the arrow relative to the second scan. Thus, the third scan commences at the rightmost solid line of FIG. 1. The third scan is completed upon scanning of the center line of FIG. 1. In this fashion, each scanning region comprises two-thirds of an image height, the total surface required for scanning only constituting fourthirds of the image height.

In a conventional television tube, of course, it is standard that 625 lines are scanned per television image, thus requiring scanning of 312.5 lines per field. Because each of the scans described above ends in the middle of the line, the transition from one scan to the next (i.e., from one television field to the next) causes a half line translation between the first and second scans so that the scanning takes place automatically in the standard alternating line manner. Further, it is known that the super-eight format in movie films has a four-to-three, length-to-width ratio, therefore causing the screen area utilized to be an inscribed square, resulting in optimal utilization of the round surface of the scanning tube.

FIG. 2 is a schematic representtion of the arrangement described above. Reference numeral 5 denotes the standard scanning tube having 625 lines. Screen 5a of this tube, over which the light beam effecting the scanning passes, is projected via an objective 6 onto an image 7a of the sequence of images. As mentioned above, the image may be a frame of a movie film. The size of the screen covered by the scanning beam corresponds exactly to four-thirds of the height of image 7a.

Photosensitive means denoted by reference numeral 8 are placed behind film 7 in the direction of propogation of the beam emanating from tube 5.

The film 7 may be driven via a friction drive as for example a pair of rollers 9 and 10 which are under spring tension. At least one of the rollers, in FIG. 2 roller 10, is operatively connected to a driving motor 11.

For each image, such as image 7a, a perforation is provided in a corresponding location at the edge of the film. Placed in proximity to this edge, is an illumination arrangement comprising light blocking means 13 having three transparent slits 13a, 13b, and 13c. A lamp 12 is placed on one side of the film. On the other side of the film are additional photosensitive means 14. During the transport of the film in the direction or arrow 2, the perforations 7b when passing slits 13a, 13b, and 13c, provide a path between lamp 12 and photosensitive means 14, thereby causing light from lamp 12 to impinge upon said additional photosensitive means. The distance between slits 13a and 13b, and slits 13b and 13c, are each one-third of the distance between two successive perforations 7b.

FIG. 3 shows the circuit for generating deflection voltages for tube 5. Reference numeral 15 represents a generator for generating the vertical synchronization pulses. This circuit generates a pulse at the exact instant for initiating the next scanning cycle, that is after 312.5 lines of the field have been scanned. Such generators are well known in the art. They generally comprise a quartz crystal for use as a frequency standard, and can however be built in other ways also. Finally, the possibility exists to derive the vertical synchronization pulse from any publicly broadcast television signal.

The pulses generated by pulse generator 5 serve to control a saw-tooth generator 16 of conventional design. This type of saw-tooth generator generates a steadily increasing signal which serves for the vertical deflection of the point of light across screen 5a. When the extreme value of this deflection voltage has been reached, the voltage returns to its initial value within a very short time period, for example, within 10 per cent of the rise time of the signal. Such sawtooth generators may for example comprise astable multivibrators, followed by a Miller integrator. Any of the known multivibrators can be used for this purpose.

Figure 4:
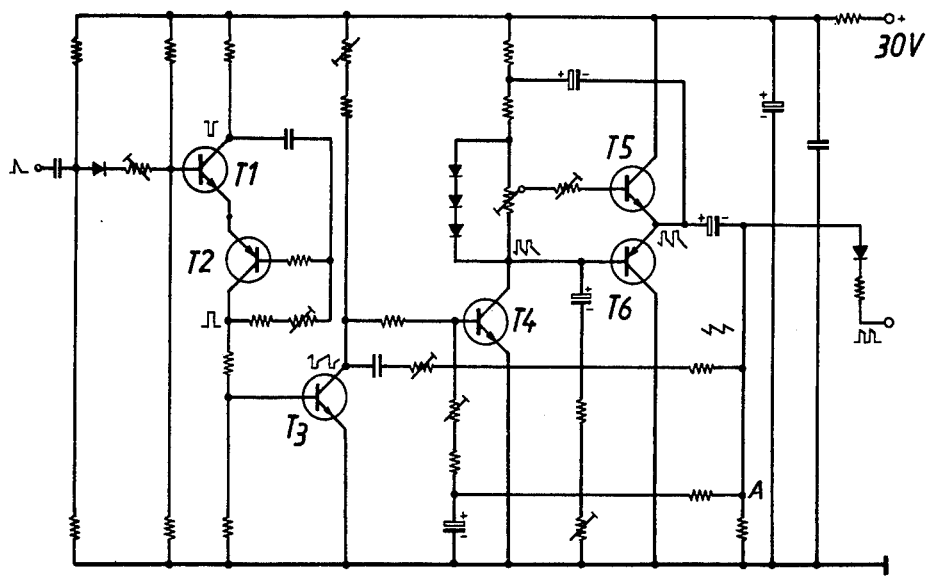
FIG. 4 is a circuit diagram of a saw-tooth voltage generator.

A particular embodiment of this saw-tooth generator may be found in FIG. 4. It comprises a transistor T1 whose input is derived from vertical synchronization pulse generator 15. Specifically, the input is applied to the base of transistor T1 via a capacitor and diode. The collector of transistor T1 is connected to the positive voltage source via a resistance R2, while its emitter is connected to the emitter of a transistor T2. The collector of transistor T2 is connected to the negative side of the supply via a resistance R4 in series with a resistance R5. The common point of resistors R4 and R5 is connected to the base of transistor T3. A capacitor C1 has a first terminal connected to the collector of transistor T1 and a second terminal connected to the base of transistor T2 via a resistance R3 and to the collector of transistor T2 via a potentiometer P2 and a resistance R6. The collector of transistor T3 is connected to the positive side of the supply via a series combination of a potentiometer P3 and resistance R7. The emitter of transistor T3 is directly connected to the negative side of supply. Further, the collector of transistor T3 is connected to the output terminal A of the circuit via a capacitor C2 and a potentiometer P4 is series with a resistance R10. The collector of transistor T3 is further connected to the base of a transistor T4 by means of a resistance. The base of transistor T4 is further connected to the negative supply line via a potentiometer P5, a resistance R8, and a capacitor C3. The voltage across capacitor C3 is connected to point A via a resistance. The emitter of the transistor T4 is connected directly to the negative supply, while its collector is connected to the base of a transistor T6, to the base of a transistor T5, and to the positive supply line via a first and second resistance R12 and R13. The connection to the base of transistor T5 is via the variable arm of the potentiometer P6 in parallel with which are a plurality of diodes. The common point of resistors R12 and R13 is connected to the emitters both transistors T5 and T6 through a capacitance C4. The collector of transistor T5 is directly connected to the positive supply line, while the collector of transistor T6 is directly connected to the negative supply. The directly - connected emitters of transistors T5 and T6 are connected to point A via a capacitance C5. Waveforms existing at different points of the circuit are indicated in FIG. 4. The output is a saw-tooth waveform at point A which point is connected to the input of a summing amplifier 19 to be described below.

Connected in parallel with the above-described sawtooth generator are a first and second additional pulse generator labeled 17 and 18, respectively. Both of these multivibrators may again be astable multivibrators. Multivibrator 17 is triggered by the vertical synchronization pulse, and generates a rectangular negative pulse following the first saw-tooth of generator 16. The amplitude of this negative pulse is half the maximum amplitude of the saw-tooth voltage furnished by generator 16. After a time period corresponding to the duration of one saw-tooth, the voltage output of pulse generator 17 returns to its initial value. The trailing edge of the negative pulse is used to trigger multivibrator 18, which then furnishes a negative pulse of an amplitude equal to the amplitude of the above-mentioned saw-tooth voltage for the duration of the third saw-tooth.

The outputs of stages 16, 17, 18 are connected to inputs of a summing amplifier 19, whose output is in turn supplied to coil 5b of tube 5 for furnishing the vertical deflection control.

Figure 5A:
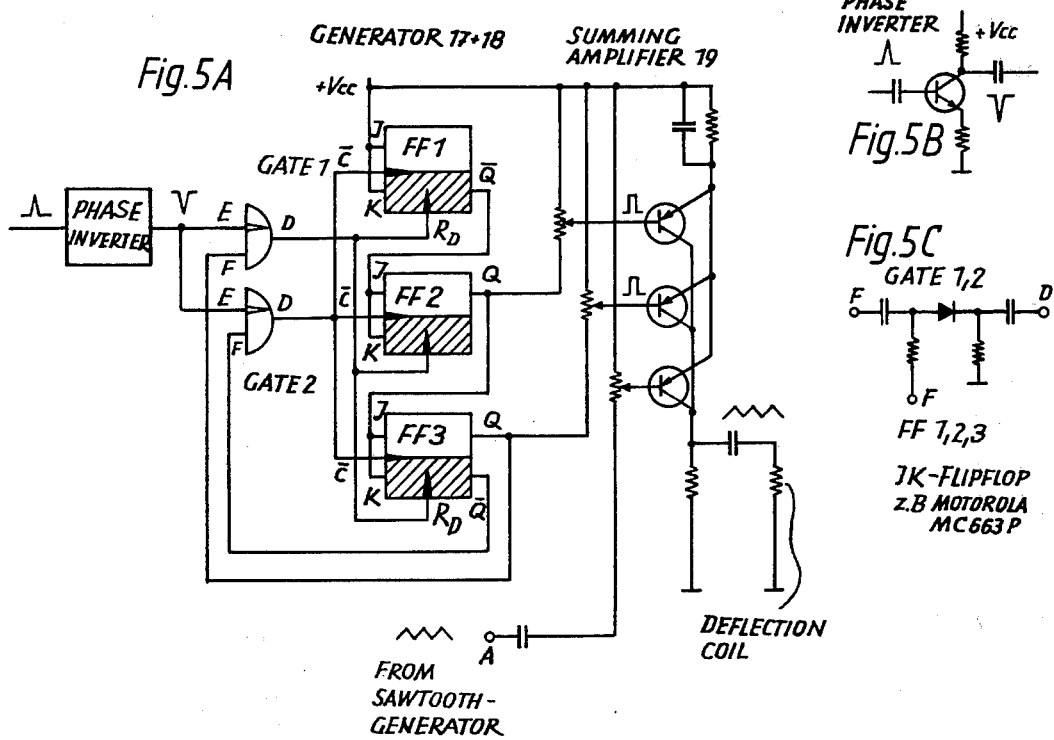
FIG. 5A shows the additional pulse generators and summing amplifiers.

FIG. 5A shows pulse generators 17 and 18 and summing amplifier 19, including the input logic circuitry to generators 17 and 18. The pulse generators themselves may be JK flip-flops as found for example in Motorola Catalogue under No. MC 663P. The circuit of FIG. 5A receives its input from vertical synchronization generator 15. Phase inverter Ph1 inverts this pulse and applies it to the E inputs of a gate 1 and a gate 2. Gates 1 and 2 are shown in detail in FIG. 5C. The second input of gate 1 is derived from the Q output of flip-flop 3, while the second input of gate 2 is derived from the $\bar{Q}$ of flip-flop 3. The output of gate 1 is applied to the RD inputs of all three flip-flops, while the output of gate 2 is applied to the trigger input of all three flip-flops. Further, the $\bar{Q}$ output of flip-flop 1 is applied to both the J and the K input of flip-flops 2, while the Q output of flip-flops 2 is applied to both the J and the K inputs of flip-flops 3. The inputs to the summing amplifier are derived from the Q outputs of flip-flops 2 and flip-flops 3. Specifically, the output of flip-flop 2 is the output required from generator 17, while that of flip-flop 3 is delayed by one saw-tooth and of double amplitude, and therefore constitutes the output of pulse generator 18. It is noted that the pulses can be positive pulses, the inversion taking place in the summing amplifier 19. It is further noted that the combination of the action of gates 1 and 2 and flip-flop 1 yield the desired time delay for the initiation of the pulse from flip-flop 2. As stated above, the pulse from flip-flop 3 is triggered by the trailing edge of the output from flip-flop 2. The output from the saw-tooth generator, as well as the output from flip-flops 2 and 3 are applied to the bases of transistors T9, T7, and T8, respectively, via potentiometers. The collectors of transistors T7, T8, and T9 are connected to ground via a resistance R14 and the emitters of said transistors are connected to the positive supply via the parallel combination of capacitor and resistor. The output of the summing amplifier is applied to the deflection coil via a capacitor C12.

Figure 5B:
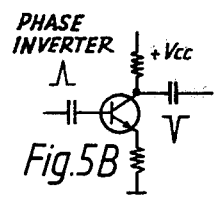
FIG. 5B shows a circuit diagram of a phase inverter.
Figure 5C:
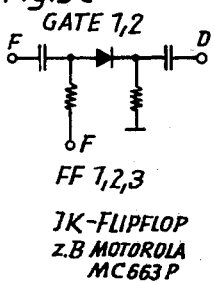
FIG. 5C shows a circuit diagram of AND gates.

Preferred embodiments of a phase inverter Ph1 and gates 1 and 2, are shown in FIGS. 5B and 5C, respectively. These are standard circuits well known in the art. Specifically, the phase inverter comprises a single transistor T10 which receives the signal from generator 5 via a capacitance at its base and furnishes the desired output at its collector. Gates 1 and 2, as shown in FIG. 5C, have a differentiating input E and a second input F applied to the anode of a diode D1. The output is derived from the cathode of diode D1 via a capacitor. The cathode of diode D1 is further connected to ground via a resistance.

FIG. 6 illustrates the variation of voltage at the output of summing amplifier 19 with respect to time. The vertical deflection voltage rises from a zero position during the scanning of the first field in one-sixtieth of a second. It achieves its maximum value just prior to the expiration of said one-sixtieth of a second and returns a value of minus one-half the maximum voltage because of the rectangular pulse furnished by multivibrator 17. From this negative one-half maximum voltage the deflection voltage increases until, after approximately one-sixtieth of a second, the value of positive one-half $V_{max}$. At the end of the second scan the voltage then immediately drops to the negative maximum value since the signals from pulse generators 16 and 17 have returned to their original value and the output of pulse generator 18 is a negative $V_{max}$. From there, the scanning of the third field (third scan) proceeds, the deflection voltage increasing towards the zero mark. The end of the third saw-tooth and the termination of the output pulse of the pulse generator 18 compensate for each other so that the voltage increase continues substantially uninterruptedly with only a short transition phase. Of course to voltage increase above the zero voltage line already corresponds to the first scan of the next frame in the sequence.

The control of motor 11 is also indicated in FIG. 3. The motor is a synchronous motor whose speed may be regulated by regulating the frequency of the applied alternating current. This alternating current is supplied via an A.C. generator 20. Within block 20, the vertical synchronizing pulse furnished by generator 15 is phase-compared with the signals derived from photoresistance 14. The signals from photoresistance 14 comprise three signals generated by the three slits 13a, 13b and 13c while a signal frame 7a is transported past these slits. If the motor 11 is operating more slowly than is indicated by the repetition rate of the vertical synchronization pulses, then the frequency of the current supply to the motor is increased, and vice versa.

Figure 7:
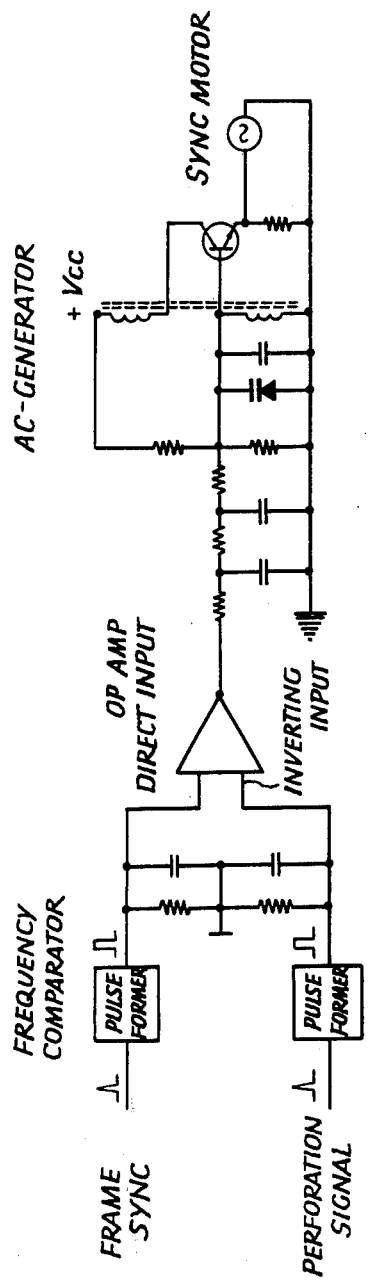
FIG. 7 shows a circuit diagram for a phase comparator and an A.C. generator.

The motor control circuit of block 20 is shown in greater detail in FIG. 7. The field synchronization signal and the signal derived from photosensitive means 14 are each separately furnished to a pulse-forming circuit. The output of each pulse-forming circuit is connected to ground via a parallel resistance-capacitance circuit. The output of the pulse-forming circuit operating on the field synchronizing signal is applied to the direct input of an operational amplifier, to whose inverting input the output of the pulse former operating on the signal derived from the perforations is applied. The output of the operational amplifier is in turn applied to an A.C. generator (oscillator) whose frequency varies with the magnitude of the output of the operational amplifier and whose output is in turn applied to the synchronous motor 11 as shown. Specifically, the oscillator comprises a transistor T11 whose emitter is connected to ground potential via a resistance in parallel with the synchronous motor winding and whose collector is connected to the primary of a transformer whose other terminal is connected to the base of transistor T11 via a resistance. The base of transistor T11 is connected to ground potential via the secondary winding of the transformer. In parallel with this winding, is a capacitor C14. The output of the operational amplifier is connected to the base of transistor T11 via a first and second RC section and a voltage divider comprising a resistance R15 and R16 at whose common point the base of transistor T11 is connected. It is seen that the synchronous motor is kept at a speed determined by the synchronization or lack of synchronization between the field synchronizing pulses and the signals derived from photosensitive means 14.

The overall arrangement described in FIG. 3 operates as follows:

Film 7 is transported at a constant velocity of one frame per 3/60 of a second by means of rollers 9 and 10.

Specifically, the film is transported past a photosensitive element 8. The velocity of motor 11 is controlled in the above-described manner by means of the signals derived from photoresistance 14. Screen 5a of cathode ray tube 5 is illuminated over a scanning region in a point-by-point manner and in synchronism with the movement of perforations 7b relative to the mask 13 shown in FIG. 2. Lens means 6 project the point onto frames 7a of the moving picture film and the photosensitive means 8 yield a corresponding scanning signal. Each frame 7a of the film is scanned three times. These scans are reproduced on the television screen in sequence, and with a one-line offset between fields, as is usual in the lines interlaced scanning of a 625-line tube. Herein it is assumed that the photosensitive means 8, which may for example be a secondary electron multiplier, registers the scanning signals corresponding to the brightness values of the film upon a surface which is one third higher than is each frame 7a.

While the invention has been illustrated and described as embodied in specific forms of scanning means, scanning control and film transport, it is not intended to be limited to the details shown, since various modifications, circuit and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Arrangement for reproducing images recorded on motion picture film at a predetermined frame rate in frames having a predetermined height in the lengthwise direction of said motion picture film, on television receiver means having a vertical scanning rate approximately equal to an integral multiple of said predetermined frame rate, comprising, in combination, moving means for moving said motion picture film continuously along a predetermined path across a predetermined scanning region; scanning means for scanning each of said frames of said film a first, second and third time over said scanning region during said movement of said frames along said predetermined path, thereby furnishing scanning signals constituting a first, second and third scan, said scanning means including a cathode ray tube for furnishing a light beam and a screen, said scanning means further comprising lens means for focussing said screen onto said frames, and photoreceiver means positioned behind said film in the direction of propagation of said light, the height of said screen exceeding the height of said image of said screen on said frames by one-third; and scan control means connected to said scanning means for deflecting said light over a region corresponding to half of said screen height for each of said scans and for changing the position of said scanning region by one-third of said image height along said predetermined path following completion of said first scan and following completion of said second scan, said scan control means comprising multivibrator means and sawtooth voltage generator means for furnishing voltages deflecting said light from an initial position to a maximum deflection in a first direction during said first scan, deflecting said light to a position corresponding to one-half the maximum deflection in the opposite direction at the start of said second scan, deflecting said light to a position corresponding to one-half of said maximum deflection in said first direction during said second scan, deflecting said light to a value corresponding to said maximum deflection in said opposite direction at the beginning of said third scan and back to said initial position at the end of said third scan; wherein said motion picture film has perforations having a predetermined spatial relationship to each of said frames; further comprising photosensitive means for furnishing location signals in response to light passing through said perforations during movement of said film along said predetermined path; and synchronizing means for furnishing synchronizing signals for synchronizing said scan control means to said moving means at least in part in dependence upon said location signals.

2. An arrangement as set forth in claim 1, wherein said scan control means comprise sawtooth voltage generator means furnishing a sawtooth voltage having a determined maximum amplitude; first additional pulse generator means connected to said sawtooth voltage generator means and furnishing a negative pulse of one-half said maximum amplitude; second additional pulse generator means connected to said first additional pulse generator means for furnishing a negative pulse having an amplitude corresponding to said maximum amplitude; and summing amplifier means having a first, second and third input respectively connected to said sawtooth voltage generator means, and said first and second additional pulse generator means, and an output connected to said deflection coil.

3. An arrangement as set forth in claim 2, wherein said synchronizing means comprise stabilized frequency pulse generator means furnishing vertical synchronization pulses; and means connecting the output of said stabilized frequency pulse generator means to the input of said saw-tooth voltage generator means.

4. An arrangement as set forth in claim 2, wherein said moving means comprise synchronous motor means; and wherein said synchronizing means comprise stabilized frequency pulse generator means furnishing vertical synchronization pulses, and means connecting the output of said stabilized frequency pulse generator means to the input of said sawtooth voltage generator means.

* * * * *